(12) United States Patent
Spiro

(10) Patent No.: US 7,898,737 B2
(45) Date of Patent: Mar. 1, 2011

(54) REMOVABLE LENTICULAR LABELS FOR USE ON PRINTED MATTER

(75) Inventor: Steven Spiro, Chappaqua, NY (US)

(73) Assignee: Tracer Imaging LLC, White Plains, NY (US)

( * ) Notice: Subject to any disclaimer, the term of this patent is extended or adjusted under 35 U.S.C. 154(b) by 49 days.

(21) Appl. No.: 12/508,778

(22) Filed: Jul. 24, 2009

(65) Prior Publication Data

US 2010/0020404 A1 Jan. 28, 2010

Related U.S. Application Data

(60) Provisional application No. 61/135,981, filed on Jul. 26, 2008.

(51) Int. Cl.
*G02B 27/10* (2006.01)
*G03B 21/60* (2006.01)

(52) U.S. Cl. ........................................ 359/619; 359/454

(58) Field of Classification Search ......... 359/618–621, 359/626, 443, 454–455; 264/1.1, 1.32, 2.7
See application file for complete search history.

(56) References Cited

U.S. PATENT DOCUMENTS

| 3,268,238 | A | | 8/1966 | Finkel |
| 3,666,465 | A | | 5/1972 | Winnek |
| 3,691,140 | A | | 9/1972 | Silver |
| 5,494,445 | A | | 2/1996 | Sekiguchi |
| 5,695,346 | A | * | 12/1997 | Sekiguchi et al. ............ 434/365 |
| 7,212,346 | B2 | * | 5/2007 | Krause ........................ 359/619 |
| 2003/0012914 | A1 | | 1/2003 | Klein |
| 2005/0266197 | A1 | | 12/2005 | Kiraly |

FOREIGN PATENT DOCUMENTS

WO    WO 2006/073961    7/2006

* cited by examiner

*Primary Examiner*—Scott J Sugarman
*Assistant Examiner*—Dawayne A Pinkney
(74) *Attorney, Agent, or Firm*—Leason Ellis LLP

(57) ABSTRACT

A lenticular label for removable attachment to a surface of an object includes a transparent sheet having a first planar side and a second side having a lenticulated region. The label having a printed image on the first planar side and a low-tack adhesive disposed along the printed image. The low-tack adhesive is configured to provide tangential adhesion between the label and the surface to which the label is removably attached.

22 Claims, 3 Drawing Sheets

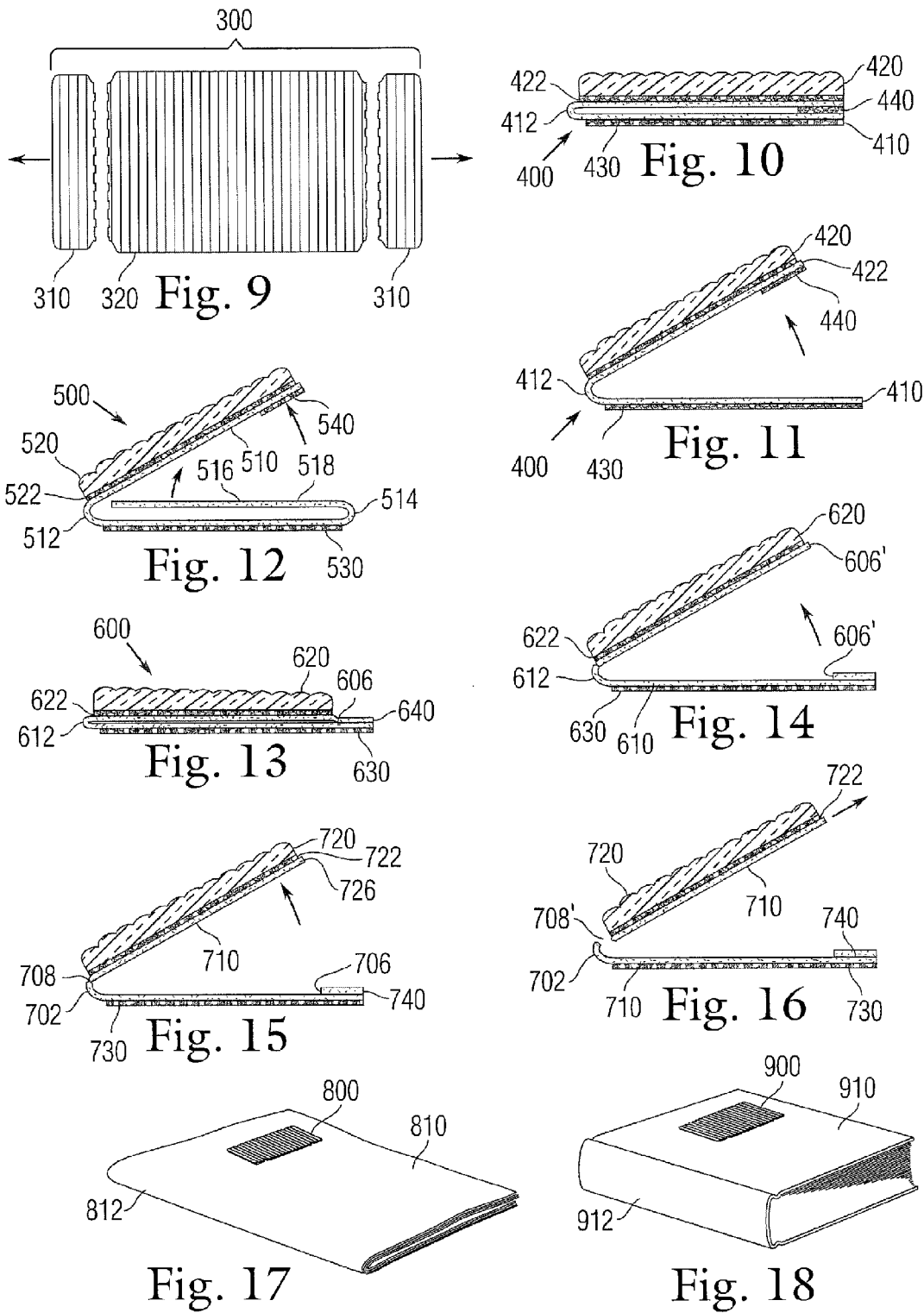

REMOVABLE LENTICULAR LABELS FOR USE ON PRINTED MATTER

CROSS-REFERENCE TO RELATED APPLICATION

The present application claims the benefit of U.S. patent application Ser. No. 61/135,981, filed Jul. 26, 2008, which is hereby incorporated by reference in its entirety.

TECHNICAL FIELD

The present invention relates to practical applications of lenticular imaging, as well as to advertising, product promotion, and the use of removable labels; and more particularly, it relates to the use of lenticular materials in as a label applied to an ephemeral periodical, such as a newspaper.

BACKGROUND

Newspapers must increasingly compete with other media in a dense and competitive informational landscape. The newspaper distributors are therefore in a constant search for methods of preserving their position as a preferred source of news and information. The moment when the consumer first observes the front page is widely known to be instrumental in whether or not the consumer engages further in the reading experience, irrespective of whether the newspaper is encountered on a newsstand or on a doorstep.

In particular, the treatment of the front page is a critical focus for both the news providers and advertisers, and is therefore essential to both the paper's public identity and its commercial revenue stream. To increase consumer interest and create opportunities for distributors and advertisers, newspapers have recently begun to be provided with applied labeling. A subset of these labels includes premium features that can be removed and retained by the consumer, such as coupons, rebate forms, or discount tickets.

It is essential in these cases that the removal of the label does not diminish the readability of the underlying product. Due to the low relative strength of newsprint, the election of a particular adhesive and label structure is therefore critical to the workability of an applied label.

The medium of lenticular imaging is widely known to draw consumer attention and increase perceptions of value. However, lenticular materials generally differ from paper or polymer label stock in that the lenticular lens sheet must have a particular thickness that commonly approximates the focal length of the constituent lenticules. Because of these and other special conditions, printed lenticular images have not been successfully adapted to complement newspaper distribution.

The attachment of lenticular imagery to a discrete base of printed material of a more conventional structure is well known and documented in the prior art. For example, in beginning June 1965, Cowles Magazines and Broadcasting, Inc. collaborated with Visual Panographics, Inc. to regularly provide covers with an applied lenticular image for a travel magazine entitled *Venture*. A roughly contemporaneous patent issued to Finkel in 1966, U.S. Pat. No. 3,268,238, similarly the use of applied lenticular images inside bound publications. U.S. Pat. No. 3,666,465 to Winnek depicts a similar arrangement. Such adhered lenticular "tip-ons" became commonplace in that era. Each of the above referenced patents is incorporated by reference in its entirety.

By 1971, Bhutan had issued an adhesive-backed lenticular postage stamp. Self-adhesive lenticular products were also subsequently devised. Lenticular collector stickers produced by Gordy International in 1984 in association with the Transformer™ brand of toys serve as exemplary self-adhesive products of this era.

In a series of patents issued to Sekiguchi, exemplified by U.S. Pat. No. 5,494,445, lenticular materials are applied as wrappers or sleeves to beverage containers and various other articles of trade.

U.S. Pat. No. 3,691,140 to Silver describes the invention of a polymer emulsion that could serve as a weak adhesive. Silver's low-tack formulation was later to be developed by 3M for use with removable and repositionable notes.

However, none of these teachings encompass the know-how necessary to manufacture and apply a product suitable for use as a non-destructive label upon a periodical newsprint document.

SUMMARY

The invention involves the use of a low-tack adhesive in combination with a lenticular label, so that the lenticular feature can be reliably removed without degradation of the text or images on the newsprint carrier.

Because of its well-known optical requirements, a lenticular label may not be as thin and compliant as certain conventional surface labels. Indeed, a degree of rigidity in the lenticular print may be intentional and desirable. For example, it is usually preferable that a lenticular image remain substantially flat, so that any intended property of angular variability will be faithfully represented to the consumer.

However, an effect encountered in the case of an applied lenticular label is that the lenticular material often resists being peeled back from the newsprint in a way that that differs from the process of removal of a conventional applied label. Specifically, most consumers will intuitively roll a label back in the process of parting it from the newsprint substrate. This habit localizes peel forces so that the risk of damage to the newspaper is minimized.

In practice, it has been found that this manner of removal is inhibited by the relative rigidity of the lenticular stock. During removal of the lenticular label by the consumer, stresses can therefore accumulate over a relative large area so that when separation of the lenticular label from the newspaper page does occur, considerable fiber fracturing occurs at the newsprint surface. The retention of these fibers on the lenticular label degrades the value of both the label and the newspaper.

Indeed, in some cases, adhesives which are successful with conventional labels have been found to cause not only lifting of text and imagery from the printed page, but, in many instances, tearing of the newsprint itself.

The invention therefore includes a set of solutions using low-tack adhesives and additional structural features so that a lenticular label can be reliably applied and later electably removed by a consumer from a newsprint carrier, without compromising any of the carrier's text or graphics.

BRIEF DESCRIPTION OF THE DRAWINGS FIGURES

The invention includes a variety of modifications extending the flexibility, utility, and commercial value of the invention. The invention and some of its potential modifications may be best understood by reference to the drawings, in which:

FIG. 9 is a plan view showing the process of separation of the detachable tabs depicted in conjunction with the label illustrated in FIGS. 7 and 8;

FIG. 10 is a cross-sectional view showing a modification of the invention using a opacifying carrier film in a bifold label application;

FIG. 11 is a cross-sectional view showing the modification of the invention illustrated in FIG. 10 with the bifold label in an open position;

FIG. 12 is a cross-sectional view showing a further modification of the invention in which the label has a trifold design;

FIG. 13 is a cross-sectional view illustrating an additional modification in which a breakable seam has been imparted to one edge of the label;

FIG. 14 is a cross-sectional view showing the modification depicted in FIG. 13, in which the breakable seam has been broken so that the top, lenticular cover layer can be folded back;

FIG. 15 is a cross-sectional view showing a further extension of the invention, in which a breakable seam has been imparted at more than one edge of the label, so that a lenticular component can be wholly separated from its carrier;

FIG. 16 is a cross-sectional view showing the process of separating the lenticular component by parting at seams connecting the lenticular component to its carrier;

FIG. 17 is a perspective view showing a label formed according to invention disposed upon a bound periodical such as a magazine;

FIG. 18 is a perspective view showing a label formed according to invention disposed upon the cover of a bound volume, such as a book.

DETAILED DESCRIPTION OF EXEMPLARY EMBODIMENTS

Figure 1:
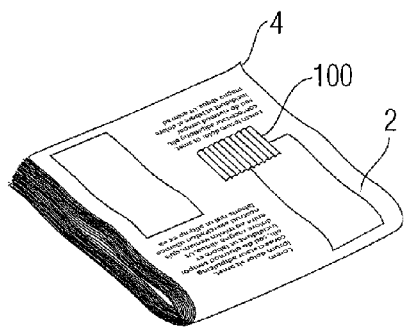
FIG. 1 is a perspective view of a newsprint document carrying a label formed according to the present invention.

The present invention relates to lenticular labels which are devised to be reversibly coupled with a discrete substrate, such as the printed page of a periodical. An exemplary application is depicted in FIG. 1, in which lenticular label 100 has been reversibly applied to front page 2 of newspaper 4.

In the original practices of lenticular imaging, a specially prepared photograph or print on paper was adhered to the flat, reverse side of a lenticular sheet. In more recent practice within lenticular image reproduction, a lenticular sheet having a characteristic ribbed lens side is more often printed on its planar reverse side using a succession of colored inks. Typically, a relatively thick flood coat of white pigment is subsequently applied over the colored ink layers to provide diffuse reflection, opacity, and protection. Alternately, a white film of polypropylene, polyester, vinyl, or other suitable polymer can be bonded to the reverse-printed imagery to provide analogous functions.

These stages being accomplished, it will be appreciated that any white space generated on the reverse may also constitute a printable surface. Lenticular images can thus readily be devised to carry conventional printed matter on the opaque layer disposed upon the planar back of the ribbed lenticular sheet. Because the visible resolution attainable via the lenticulated side is limited by the pitch of the lenticules, the back side of lenticular images has often been exploited as a surface carrying more detailed information than could be exhibited in practice by the lenticulated face.

The present invention is particularly directed to applications in which a lenticular label is disposed upon a published article so that it can be removed without damage to the underlying publication. The election of a particular strategy within the range provided by the present invention depends upon the type and configuration of material to which the label is to be adhered. Of particular concern to the invention are published articles made from relatively fragile fibrous materials, such as newsprint or other uncoated paper.

Uncoated papers are increasingly encountered as a cost-cutting measure but tend to a have a loose fiber structure that resists reliable adhesion. Adhesives which have a sufficient tenacity to be reliably retained on the exposed fibers of the paper's surface tend to damage the paper substrate when any attempt is made to disturb or lift the label.

This problem is aggravated by the relative thickness of lenticular lens stock. Lenticular materials suitable for surface labeling typically fall in the range of 0.2 mm to 0.5 mm (8 to 20 mils) in thickness. In contrast, a conventional paper or synthetic polymer film label material that is typically applied to published articles might only be 0.06 mm in thickness (~2.5 mils). Furthermore, the lenticular lens sheet is expressly formed to remain stiff to avoid angular distortions in the observed image and therefore the bending thereof is not encouraged. The intuitive practice or reducing peel stress between the label and the substrate by rolling back a corner of the label is therefore generally defeated by the thickness and rigidity of the ribbed lenticular sheet.

Figure 2:
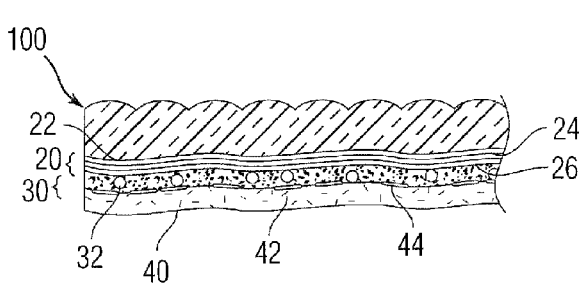
FIG. 2 is a cross-sectional view of a printed label formed according to the invention reversibly adhered upon a page of a publication.

The present invention therefore describes particular solutions that ease the parting of the label from its substrate such as printed publications. These innovations may be used discretely or in combination to achieve the targeted results. Referring now to the drawings, FIG. 1 is a depiction of lenticular label 100 in place upon a front page 2 of a newsprint periodical 4. FIG. 2 shows the detailed structure of the applied lenticular label 100. Lenticular label 100 includes a lenticular array 10 which includes an array of lenticules 12. The array 10 can be composed of a monolithic extruded refractive thermoplastic polymer such as amorphous polyethylene (APET) or glycol-modified polyethylene terephthalate (PETG).

The lens array 10 can also be devised by any other workable means, such as the casting of a thermoplastic, thermoset resin, or curable lacquer upon a carrier film, or additionally by methods such thermoforming, embossing or the deposition of initially liquid lines or droplets regulated by surface tension. The invention is not constrained by the formation of the lenses of a particular material or at a particular stage, and any such array may contain structures, forms, and compositions not here illustrated.

Ink stratification 20 (print image/print layer) is applied sequentially to the planar unlenticulated reverse side of lenticular array 10. Interlaced imagery 22 may include a single ink channel only, but may also include plural color channels. Plural ink channels are not differentiated in this schematic illustration, however, it may be appreciated that this practice is well understood, as in the widespread technique of conventional four-color printing.

Opacifier 24 can be an uninterrupted conformal layer of white ink containing an opacifying reflective mineral agent such as titanium dioxide ($TiO_2$) dispersed within a fluid binder. The opacifier may result from multiple applications of white ink, or, alternately, by a single application of pigment by a high volume fluid transfer method such screen printing or anilox coating. Although the label can be wholly coated by these methods, the opacifier need not always pervade the entire surface. For example, windows may be left in the opaque coat for any desired visual or functional effect.

It may also be appreciated the opacifying means represented here by opacifier 24 need not be applied in a fluid state, but may otherwise originate as a distinct sheet of material such as paper or a polymer film. A suitable opacifier is a 65 micron (2.6 mils) white polypropylene. A polymer opacifier, whether applied as ink or film, may include other colorants in place of or in combination with $TiO_2$, as long as the elements provide a worthwhile visual function.

Backside printing 26 can include any suitable text or graphics, and again can include multiple discrete ink channels. As the backside printing is typically isolated from optical effect of lenticules 14 by opacifier 24, it would therefore not usually include content interlaced for use in combination with the magnifying effect of the lenticules. An exception might be in a case in which a clear window was left in the opacifier, as described previously.

Low-tack adhesive 30 includes resilient spherules 32 which partially populate the back surface of lenticular label 100. The low-tack adhesive may be an emulsion carrying an acrylate in dispersion so that, upon curing, the distribution of spherules can be fairly regular. In the process of curing, the spherules tend to conform somewhat to the planar surface, while retaining a convexity of form on their exposed regions. In practice, this process results in a population of domed spherules over the coated surface.

As used herein, the term "low-tack adhesive" generally refers to an adhesive that provides a weak bond between two objects and can be used again and again. For example, the low-tack adhesive can be made of tiny, indestructible acrylic spheres that stick only where they are tangent to a given surface, rather than flat up against it. As a result, the adhesive's grip is strong enough to hold one article to another, but weak enough to allow the articles to be pulled apart again without causing damaged (e.g., being torn). The adhesive can be used again and again.

Upon application to a printed page 40 including printable material 42 and carrying printed matter 44, it will be seen that the convexity of resilient spherules 32 at their points of tangency T with printed page 40 induces only tangential adhesion. This limited adhesion results in a long-term low tack condition. In practice, the spherules are typically retained upon the surface to which they were initially applied, owing to the greater area of contact of the spherules to that primary surface.

Figure 3:
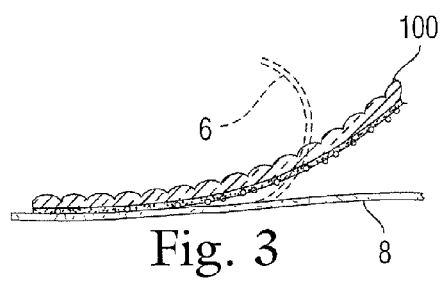
FIG. 3 is a cross-sectional view showing the process of peeling a lenticular label from the page of a document relative to the action of removing a conventional thin applied label.

In the case of a label applied with a low-tack adhesive, the stronger bond is typically to the label. In parting, the spherules are therefore typically retained on the label, with little residuum left on the carrier publication. FIG. 3 illustrates the process of lifting lenticular label 100 from single page 8.

Single page 8 can represent a front page as in the case of front page 2 in FIG. 1, or can be the first page in a section, or even an internal page of the publication.

The relatively greater flexure of thin label 6, here suggested by a broken outline, schematically depicts the difference in the process or parting a label from its substrate. The flexure of the lenticular label may be seen to be less acute than in the case of a conventional thin paper or polymer film label.

Because of the lenticular labels relative resistance to flexure, its parting line is generally broader than that of a thinner label. A greater number of spherules will connect the label to the page at any given moment in the parting process. Since each spherule is elastic, adhesive, and under expansion stress, the lacal force imparted to the page will be greater in the lenticular case than in the case of a conventional removable label. Therefore, if damage is to be avoided to potentially fragile materials such as inks or paper fibers, an adhesive of especially low tack must be used.

Newsprint may be considered a particularly challenging case, as the fibers are relatively short and bound in a relatively loose matrix. An adhesive which has been found to be particularly applicable to the invention is Polymeric GPA-020, a low-tack, water-based clear acrylic adhesive. This adhesive has provided a reliable adhesion to newsprint and other uncoated papers, causes no visible marring of the printed matter, and leaves no appreciable residue when the label is lifted. Furthermore, the adhesive is effectively optically clear, allowing even fine text enabled by backside printing 26 to be legible through the adhesive coating.

It may be appreciated that there are occasions when it is desirable to remove and retain a portion of a label or label package. If a removable label carrying a low-tack adhesive is parted from its carrier and retained by the user, whatever region is coated with low-tack adhesive will tend to accumulate dust, lint, etc., resulting in a reduction in the attractiveness of the item and compromising the legibility of the underlying content. Furthermore, the retained component may frustrate the user by unwanted adhesion to other contents of a wallet, purse, pocket, etc.

In a more specific example, a newspaper might feature a label each week including content disposed to serve as a recipe card. It may be appreciated that a series of recipe cards collected by a consumer over a period of weeks would be of little service if they were disposed to fuse into a solid deck, or if they accumulated so much kitchen debris that they were no longer legible.

Figure 4:
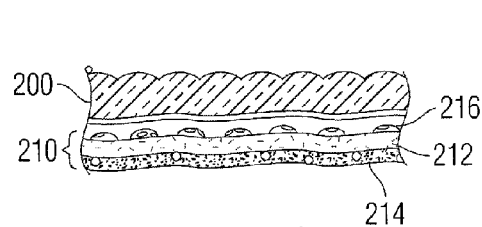
FIG. 4 is a cross-sectional view of a label having a discrete and separable carrier layer, in which the arrangement includes two reversible adhesives having differing properties.

The invention therefore includes modifications which permit the complete parting of any exposed adhesive regions from the retained component. FIG. 4 shows retainable lenticular component 200 provided with a strippable carrier 210. Strippable intermediate carrier 210 includes intermediate carrier sheet 212, which can be a paper product such as a coated paper, or a synthetic material such as a polyethylene film.

The intermediate carrier is provided with two low-tack adhesive coatings 214 and 216 (first and second adhesives, respectively). Here, the two coatings have differing degrees of tack, although both would be described by convention as being as providing both low tack and reversibility. It will also be appreciated that the two coatings can have essentially the same tack. In FIG. 4, first adhesive 214 is disposed on the exposed underside of retainable lenticular component 200, while second adhesive 216 is applied to intermediate carrier ply 212 and subsequently disposed between intermediate carrier ply 212 and the planer back side of retainable lenticular component 200. First adhesive 214 has a relatively lower tack value than second adhesive 216, although the difference can be small. For example, a waterborne adhesive may be diluted by about 20% to create a more rarefied dispersion of spherules, thereby generating the desired disparity of adhesion.

Figure 5:
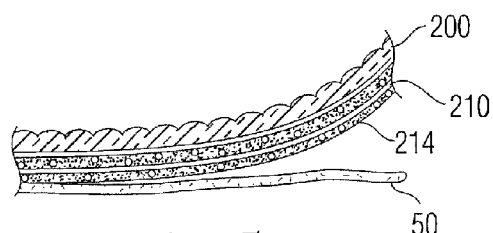
FIG. 5 is a cross-sectional view to the lenticular label of FIG. 4 being removed from a page.

The label shown in FIG. 4 can be applied to a document such as a newspaper, magazine, or book. The separation of retainable lenticular component 200 from document 50 is depicted in FIG. 5. Because of the relatively stronger bond between retainable lenticular component 200 and the strippable carrier sheet, these two components will typically separate from the document as a unit.

Figure 6:
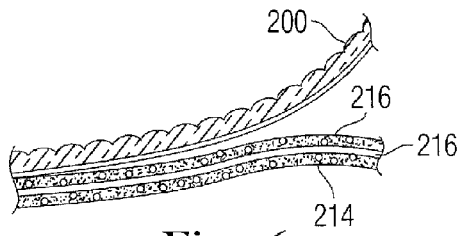
FIG. 6 is a cross-sectional view of the lenticular label of FIG. 4 being removed from its intermediate carrier.

The removal of the strippable carrier 210 from retainable lenticular component 200 is depicted in FIG. 6. The carrier sheet may be discarded, and the retainable lenticular component kept by the user for whatever use was intended by its designer. Examples of such uses include recipe cards, coupons, gamepieces, collectibles, puzzle pieces, tickets or promotions.

FIGS. 7 through 10 inclusive show a lenticular label in which the adhesive bearing regions are separable by means of marginal extensions which can be electively parted along designated seams. These seams can be scored or perforated to create relatively weak paths along which the extension or extensions can be parted from the retained lenticular item.

Figure 7:
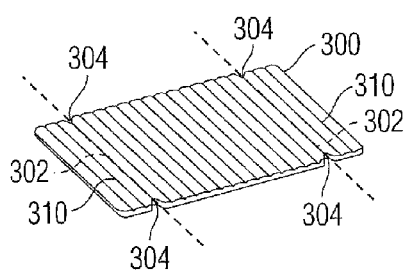
FIG. 7 is a perspective view of a label having detachable tabs, showing features promoting detachment.

FIG. 7 is a perspective view of label formed according to this modification. Tabbed lenticular label 300 has one or more tabs which are marginal extensions 310. The extensions 310 are distinguished from retainable portion 320 by features which promote the reliable separation of the marginal extensions 310 from retainable portion 320. Tear seam 302 can, for example, be perforation, scoring, or a kiss-cut through to a supporting backer material.

Such separation features can include internal cusps as an aid to parting the marginal strips from the portion to be retained. Perimeter internal cusp 304 includes two radii which converge at a point of tangency to provide a visual indication of the starting points for the separation. The cusps 304 also serve to initiate the breaking (rupturing) of the seam. An indentation, notch, or kerf may serve the same purpose. The substrate material, for example a publication printed on paper, is not shown here.

Figure 8:
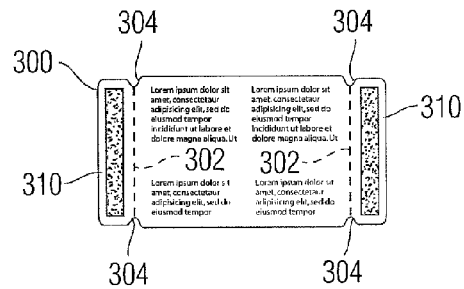
FIG. 8 is a plan view showing the reverse of a lenticular label, the label carrying printed matter upon its unlenticulated side, and furthermore including two detachable adhesive tabs at its margins.

FIG. 8 shows the lenticulated side of tabbed lenticular label 300 as it would appear to a consumer who had removed the tabbed label from its carrier. It may be seen that tab adhesive 340 has been selectively applied in two bands so that both margins could be securely adhered to the substrate material. The retainable portion can carry retainable printed content 330 on its unlenticulated side such as recipes, business data, redemption instructions, etc.

FIG. 9 shows two discardable extensions 310' having been parted from the main body of retainable portion 320. The marginal extensions 310' can be electively disposed of so that the label can be retained without any residual adhesive occupying any part of its surface.

FIGS. 10 through 16 inclusive describe three distinct types of folding labels specially adapted for use in conjunction with lenticular materials. Because of its relative thickness, lenticular lens sheet is difficult to fold. Even when folded, the lens sheet often resists lying flat at the folds in manner that precludes its use in automated packaging and distribution systems. In the following modifications, lens sheet is combined with relatively thin backing material so that any folds are made to occur outside the lenticulated area.

In FIG. 10, bifold label 400 has lenticulated region 420 disposed upon bifold foldable substrate 410 such as 3 mils white polypropylene. Interlaced bifold label cover content 422 can be interlaced preprinted on the lenticular lens component. Fold 412 induces the relatively thick lenticulated portion to overlay the balance of the substrate so that closure adhesive 440 can provide a means of keeping the bifold label closed until opened by a consumer. Bifold label adhesive 430 provides a means of attachment to a carrier document. Both the closure adhesive and the bifold label adhesive can be low-tack adhesives.

FIG. 11 shows the operation of the bifold label. The lenticulated component is lifted along the temporarily closed seam so that the adhesive parts from the unlenticulated face of the substrate. This label may be used to expand the useful area of the label without excessively intruding on the visible area of the underlying publication (not shown here). Such a label can be devised to be repeatedly reclosable.

FIG. 12 shows a further modification of the invention in the form of a trifold label. This modification further increases the available visual area of the label. In FIG. 12, bifold label 500 has trifold lenticulated region 520 disposed upon trifold foldable substrate 510. Interlaced trifold label cover content 522 can be interlaced preprinted on the lenticular lens component, in a manner analogous to bifold label 400.

Trifold first fold 512 and trifold second fold allow the substrate material to be conformed into a three-ply configuration. Trifold closure adhesive 540 can provide a means of securing the label shut until electively opened. Trifold label adhesive 530 provides a means of attachment to a carrier document. Again, both the closure adhesive and the label adhesive can be low-tack adhesives.

Trifold second fold borders outer surface 516 and inner surface 518. The inclusion of these two surfaces doubles the printable unlenticulated area of the label without automatically increasing its footprint on the underlying published periodical.

Folded labels of the type shown in FIGS. 10 through 12 can be devised to be opened and reclosed. Such labels can provide little evidence of tampering. It may therefore be desirable in some cases to provide a lenticular label with a destructive opening feature so that the opening action is limited to a single occurrence. FIGS. 13 and 14 show an example of a secure lenticular label devised to provide such a property.

Secure label 600 includes lenticular lens area 620 which is furnished with interlaced secure label content 622 and mounted on secure label substrate 610. The label is coated on its underside with secure label adhesive 630. The substrate may be paper, or a synthetic material such as a polypropylene film. The secure label substrate includes secure label fold 612 and breakable seam 614. Permanent seal 640 joins at least part of one edge where the folded substrate meets itself. The seal may be provided an adhesive, but may also be a thermal weld in the case of substrate of polymer composition. It will be understood that upon application of a sufficient degree of force, the permanent seal 640 is rupturable.

FIG. 14 shows the lenticular label of FIG. 13 after its having been opened by a consumer. Breakable seam 606 may be parted by an instrument such as a fingernail to leave broken seam edges 606'. Labels formed according to this variation of the invention might conceal premium data for subsequent matching, individually varied coupon values, or any other data that might be advantageous to conceal past the moment of purchase of the associated published document.

FIGS. 15 and 16 show an embodiment which combines previously described features of the invention. Divisible label 700 is analogous to secure lenticular label 600 except that the lenticular cover piece is fully separable from the remainder of the label. The divisible label includes division seam which allows the lenticular cover piece to be readily folded back or electively parted from the unlenticulated portion.

FIG. 15 parallels the depiction of the opened secure lenticular label 600 shown in FIG. 14. However, it may be observed that divisible label 700 has been provided with a second breakable seam 708' within divisible label substrate 710. Divisible lenticular array 720 is provided with interlaced imagery 722. The substrate includes seamed fold 712 and edge joint 740. First seam 706 is shown here as already broken so that the label may be opened.

FIG. 16 shows the further operation of the divisible lenticular label. Here, the lenticular component is shown as having been separated at divided second seam 708' so that the lenticular imagery and any content on its planar reverse may be retained by the consumer. In such a case, no substrate label adhesive 730 need remain with the lenticular component.

FIG. 17 depicts an application of the invention to a simple bound document such as a magazine, report, brochure, booklet, or paperback book. Lenticular label example 800 is shown adhered to the cover of simple bound document 810. Simple binding 810 may be provided, for example, by glue, staples, or stitching.

FIG. 18 depicts an application of the invention to a complex bound document a softbound or hardbound book. Lenticular label item 900 is shown adhered to the cover of complex bound document 910. A complex binding is one in which the document is prepared in plural signatures. Complex binding 912 may be provided, for example, by gluing, stapling, or stitching, or any combination thereof.

It may be appreciated that the invention provides many innovations which increase the utility, the practicability, and the ease of use of lenticular materials within label applications. The invention should not be construed to be limited by the examples herein described and depicted, nor even to their direct and self-evident combinations. For example, structure, features and properties may be analogously substituted for, and yet still fall within the intended spirit and scope and of the present invention.

It is understood that adhesive properties such as tack, curing, adhesion, bonding, and aging can be promoted or discouraged in various ways to attain the goals and advantages of the invention. The values and qualities recited herein should therefore be taken only specific in their service of the requirements of enablement and description of the present invention. For example, a low-tack adhesive may be formulated by diverse means, and is not intended to be restricted to any particular process or composition, nor to any method of preparation, dispersion or dispensing.

Detachable processes may include permanent adhesive, as when a detachable lenticular label is attached to a sacrificial feature such as an applied or bound flap or tab, or as when the region to which the attachment is made is not taken by the merchant to be critical to the sale of the labeled product. Such a sacrificial region or structure may be blank or printed. As one example, periodicals often include prices for various national currencies, and a label might carry a permanent adhesive strip that expressly veils any inapplicable monetary units.

Constituent materials and methods can be highly variable. For example, layers of the label can be tinted, patterned, made locally or entirely diffusive, or made only partially opaque or partially transparent, and still comply with the intended scope of the present invention. Embodiments of the invention may also include any such features as may be elected for a given design, including formed, printed, transferred, applied or laminated materials. Such materials might encompass diffractive features such as holograms or other gratings. They might also include magnetic strips, recordings, or text, embossings, hot-stamped foils, bar codes, cut-outs, clear or tinted windows, pop-ups, scratch coatings, or electronic components. Electronic components might provide functions such as identification, transaction history, memory, light, or sound.

In the further pursuit of the goals of the invention, it has been found particularly cost-effective in certain situations to depart from the strict practice of applying a coat of pressure-sensitive adhesive in favor of a programmed drop-on-demand adhesive application. Drop-on-demand adhesive systems are employed for such purposes as bonding brochure bindings, or sealing postal mailers; however, are not common in lenticular products.

Typically, lines or dots of glue are deposited in a preprogrammed pattern upon printed matter, and the document is assembled or folded in the desired manner. One class of glue employed in this type of system is known as a fugitive adhesive. A fugitive adhesive is an adhesive upon application, but removable from the article surface after curing. A fugitive adhesive therefore allows a mailer or other document to be sealed at a point or along a margin without resulting in destruction of the paper surface upon parting of the seal.

A fugitive adhesive differs functionally from a repositionable adhesive in that a fugitive adhesive is no longer adhesive once the original bond is broken. A fugitive adhesive may also be formulated such that it may be fully removed by the recipient from one or both of the formerly bonded surfaces.

The use of the present invention in conjunction with a drop-on-demand adhesive system may be generally appreciated through its specific application to the manufacture of a self-mailer. A self-mailer is generally understood to be a form of postal message which encloses a printable surface without resort to a discrete and separate envelope.

The most common forms of self-mailers are known as bifold and trifold mailers. Both result from the folding of a single sheet of paper or paperboard into a more compact format. A bifold mailer has a single fold and two leaves, while a trifold mailer has two folds and three leaves. While these are common forms, there are nevertheless many other variants and modifications of self-mailers.

When prepared for posting, the mailer is typically provided with a closure means, such as an edge sealant or self-adhesive paper tab. Self-mailers are popular for advertisements and direct-mail promotions, as a recipient's response often depends upon both the directness of the message, and the ease with which it may be accessed and apprehended. In the invention, the novel use of fugitive adhesive is independent of the conventional folding, binding and sealing functions to which such drop-on-demand gluing is usually applied.

Figure 19:
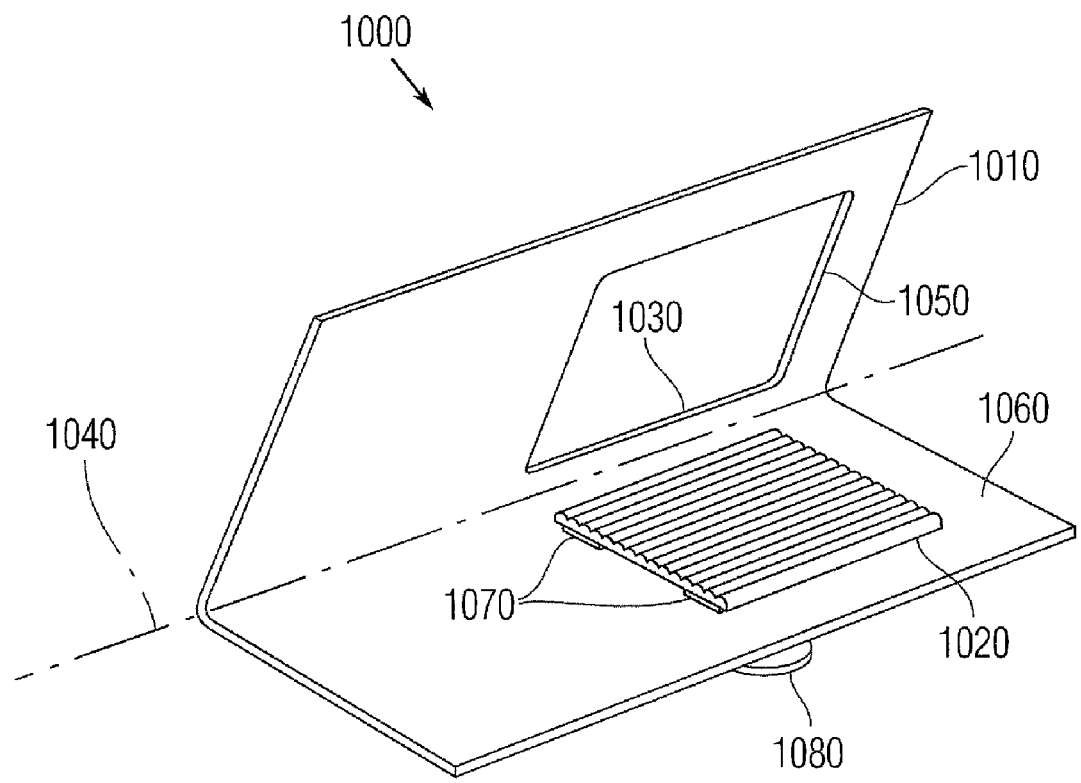
FIG. 19 is a perspective view of a self-mailer formed in accordance with the present invention.

A self-mailer formed in express accordance with the invention is depicted in FIG. 19. A bifold mailer is shown for the purpose of illustration. Assembled lenticular mailer 1000 includes a bifold mailer base sheet 1010 and a lenticular insert 1020. A window 1030 is formed in the bifold mailer base sheet 1010, typically by a die-cutting process; however, other processes can be used. The bifold mailer base sheet 1020 is divided by line 1040 to form and define a front leaf 1050 and a back leaf 1060. The mailer 1000 is conscientiously designed so that window 1030 will overlay the lenticular insert 1020 upon folding of bifold mailer base sheet 1010 along line 1040.

To apply the lenticular insert to back leaf 1060 of bifold mailer base sheet 1010, a fugitive adhesive 1070 is applied to one or more targeted areas of back leaf 1060. The lenticular insert 1020 can be prefabricated and is then positioned and mounted to bifold mailer base sheet 1010 using the preapplied fugitive adhesive 1070. Folding of the document can then be effected in the manner anticipated in the preceding description. The folded mailer 1000 may then be sealed by any elected means, represented here by a sealing tab 1080.

The term "insert" is used herein without the distinction of meaning which is sometimes applied in the lenticular trade, in which an "insert" is distinguished from an "onsert" according to the layering of the paperboard support. The term "insert" in the intended use within this application is intended to encompass any lenticular element which is attached to a supporting document, and its understanding should not be limited to the insertion of the lenticular element into a contiguous recess. Within the invention, the supporting document may therefore be die-cut, folded, and glued in various ways to frame, support, or successively reveal the lenticular insert without exceeding its intended scope.

The invention should therefore not be taken to be limited by the preceding descriptions, but instead its reach should be construed only by the broadest extent of its allowable claims.

What is claimed is:

1. A lenticular label for removable attachment to a surface of an object comprising:
    a transparent sheet having a first planar side and a second side having a lenticulated region;
    a printed image on the first planar side; and
    a low-tack adhesive disposed along the printed image, the low-tack adhesive being configured to provide tangential adhesion between the label and the surface to which the label is removably attached.

2. The label of claim 1, wherein the printed image includes interlaced imagery and an opacifier that forms an outer layer of the printed image.

3. The label of claim 2, wherein the opacifier comprises an uninterrupted conformal layer of white ink.

4. The label of claim 1, further including a backside printing that is disposed on the printed image.

5. The label of claim 1, wherein the low-tack adhesive comprises resilient spherules that partially populate a back surface of the printed image.

6. The label of claim 5, wherein the low tack adhesive comprises an emulsion carrying an acrylate in dispersion.

7. The label of claim 1, wherein the object comprises printed matter.

8. A lenticular label for removable attachment to a surface of an object comprising:
    a transparent sheet having a first planar side and a second side having a lenticulated region;
    a printed image on the first planar side;
    a strippable carrier that includes an intermediate carrier sheet that has a first face and an opposing second face, the first face facing the surface of the object, the second face facing the printed image; and
    a first low-tack adhesive disposed along the first face of the carrier and a second low-tack adhesive disposed along the second face of the carrier, the first low-tack adhesive providing tangential adhesion between the carrier and the label, the second low-tack adhesive providing tangential adhesion between the label and the surface of the object, whereby the carrier is easily removed from the label to separate the two from one another.

9. The label of claim 8, wherein the second low-tack adhesive has a lower tack value compared to the first low-tack adhesive.

10. The label of claim 8, wherein the low-tack adhesive comprises resilient spherules that partially populate a back surface of the printed image.

11. The label of claim 10, wherein the low tack adhesive comprises an emulsion carrying an acrylate in dispersion.

12. The label of claim 8, wherein the object comprises printed matter.

13. A lenticular label for removable attachment to a surface of an objected comprising:
    a transparent sheet having a first planar side and a second side having a lenticulated region;
    a printed image on the first planar side; and
    at least one rupturable tab member releasingly attached along one edge of the transparent sheet, wherein a bottommost surface of the tab member includes a low-tack adhesive, the low-tack adhesive being configured to provide tangential adhesion between the tab member and the surface to which the label is removably attached.

14. The label of claim 13, wherein the tab member is attached to the edge along a tear seam.

15. The label of claim 13, wherein there are two rupturable tab members disposed along opposing side edges of the transparent sheet, wherein opposing edges of the tab member and transparent sheet defines an internal cusp that serves as an aid to detach the tab member from the transparent sheet.

16. A foldable lenticular label for removable attachment to a surface of an object comprising:
    a lenticulated structure including a transparent sheet having a first planar side and a second side having a lenticulated region and a printed image on the first planar side;
    a foldable substrate having a first face and an opposing second face, the lenticulated structure being disposed along the first face, the substrate being folded along a first fold; and
    a low-tack adhesive disposed along at least a portion of the first face of the substrate on one side of the first fold, the low-tack adhesive being configured to provide tangential adhesion between the label and the surface of the object to which the label is removably attached.

17. The label of claim 16, wherein the lenticulated structure is disposed along the first face on the substrate on another side of the first fold, wherein a low-tack closure adhesive is disposed along the second face of the substrate for releasable attachment to another region of the second face of the folded substrate, the closure adhesive providing a means for releasably holding the label in a folded position.

18. The label of claim 17, wherein the substrate is folded along a second fold, opposite the first fold, to define an intermediate folded section that is disposed between a portion of the substrate that contains the lenticulated structure and a portion that contains the low-tack adhesive.

19. The label of claim 17, further comprising a rupturable permanent seal that maintains the lenticulated structure and foldable substrate in a folded position.

20. The label of claim 19, wherein the permanent seal is formed adjacent and a free edge of the lenticulated structure and an end of the substrate.

21. The label of claim 20, further including a second rupturable seam formed proximate the first fold, whereby the lenticulated structure can be freely removed by rupturing of the permanent seal and the second rupturable seam.

22. The label of claim 17, wherein a thickness of the lenticulated structures is between about 8 mils to about 20 mils.

* * * * *